(12) United States Patent
Jonsson et al.

(10) Patent No.: US 8,587,974 B2
(45) Date of Patent: Nov. 19, 2013

(54) METHOD AND DEVICE FOR INCREASING CONTROL ACCURACY IN A PWM SYSTEM

(76) Inventors: Ragnar Jonsson, Ystad (SE); Henrik Hemark, Lund (SE)

( * ) Notice: Subject to any disclaimer, the term of this patent is extended or adjusted under 35 U.S.C. 154(b) by 318 days.

(21) Appl. No.: 12/934,314

(22) PCT Filed: Mar. 24, 2009

(86) PCT No.: PCT/SE2009/000156
§ 371 (c)(1),
(2), (4) Date: Sep. 24, 2010

(87) PCT Pub. No.: WO2009/120131
PCT Pub. Date: Oct. 1, 2009

(65) Prior Publication Data
US 2011/0018521 A1 Jan. 27, 2011

Related U.S. Application Data

(60) Provisional application No. 61/198,746, filed on Nov. 10, 2008.

(30) Foreign Application Priority Data

Mar. 25, 2008 (SE) ........................................ 0800663

(51) Int. Cl.
*H02M 7/5387* (2007.01)
*H02M 7/5395* (2006.01)

(52) U.S. Cl.
USPC ............................................. 363/98; 363/132

(58) Field of Classification Search
USPC ................... 363/95, 97, 98, 131, 132
See application file for complete search history.

(56) References Cited

U.S. PATENT DOCUMENTS 5,847,554 A * 12/1998 Wilcox et al. .................. 323/282
7,327,129 B2 * 2/2008 Chen et al. ..................... 323/285

FOREIGN PATENT DOCUMENTS

EP 0588213 A2 3/1994

OTHER PUBLICATIONS

Choi et al. "Inverted Output Voltage Synthesis Using Novel Dead Time Compensation", Department of Electrical Engineering, p. 100-106.
Kerkman et al. "Effects of Parasitics on the Control of Voltage Source Inverters", IEEE Transactions on Power Electronics Jan. 2003, vol. 18, No. 1, p. 140-150.
Holtz, Joachim and Quan, Juntao, Draft and Parameter Compensated Flux Estimator for Persistent Zero Stator Frequency Operation of Sensorless Controlled Induction Motors, IEEE Transactions on Industry Applications, vol. 39, No. 4, Jul./Aug. 2003, pp. 1052-1060.

\* cited by examiner

*Primary Examiner* — Gary L Laxton
(74) *Attorney, Agent, or Firm* — Brooks Kushman P.C.

(57) ABSTRACT

A method and a device for operating a bridge power supply circuit comprising at least two switch members connected in series between two rails and operated alternatingly to provide a pulse width modulated output signal at a junction between the two transistors. A measurement circuit measures a voltage drop over the lower switch member during conduction of said switch member. The measurement is performed approximately in the middle of the ON-period and is used in the next cycle for calculating the timing signals. A control signal (Ucontrol) is received at an input for the pulse width modulated output signal. The measured voltage drop is added to the control signal before calculating the timing signals. The voltage drop is scaled by a scaling factor of for example 0.8 before being added to the control signal.

17 Claims, 9 Drawing Sheets

*Figure 4*
$I_R \geq 0$

*Figure 5*
$I_R \leq 0$

METHOD AND DEVICE FOR INCREASING CONTROL ACCURACY IN A PWM SYSTEM

CROSS-REFERENCE TO RELATED APPLICATION

This application is a National Phase of PCT/SE2009/000156 filed Mar. 24, 2009, which claims priority from Swedish Patent Application No. 0800663-7 filed Mar. 25, 2008 and the benefit of U.S. provisional application Ser. No. 61/198,746 filed Nov. 10, 2008, the disclosures of which are incorporated in their entirely by reference herein.

FIELD OF THE INVENTION

The present invention relates to a method for increasing control accuracy in a pulse width modulated bridge power circuit.

BACKGROUND OF THE INVENTION

Pulse width modulation (PWM) is one of the dominating methods for control of electrical power supplied by a power supply to electronic means. Modern power transistors are capable of switching high voltages ($\geq 1000$ V) and high currents ($\geq 100$ A) with high switching speed. Pulse width modulation results in a very high efficiency, close to 100%.

Pulse width modulation has become a de facto standard especially for the supply of electric power to electric motors.

A three-phase bridge power supply for AC motor control is described as an example. The power supply may, however, be used also in other applications, for example in modern pulse width modulated audio amplifiers (often referred to as Class D amplifiers). Such amplifiers operate with a high PWM frequency, typically a few hundred kHz. They are provided with an LC filter at the output, with the effect that the operating conditions are similar to those in a single phase of a motor drive system. Audio amplifiers operate with a relatively low supply voltage and consequently voltage drops in the switch members may be detrimental.

A problem with all PWM power supply circuits is that the control accuracy may be influenced upon by voltage drops in different portions of the circuit.

One method for improving the control accuracy would be to measure the output voltage via an analog low-pass filter for the PWM-voltage provided at the output of the power supply and then make a feedback loop that controls the power supply and adjusts the output voltage to a correct value. This method is, however, sometimes not very useful, for example for motor control purposes. It would be necessary to have a low bandwidth in the analog filter, in order to get a sufficiently smooth waveform. This would make it necessary to have a low bandwidth also in the feedback loop and consequently it would be difficult to control high motor frequencies with good accuracy. Such a control method may work well for example in DC/DC-converters, but may work less well in motor control systems and other systems where the frequencies are typically 50 Hz and often much higher.

EP 0588213A2 discloses an inverter, which corrects an output voltage by the magnitude of output voltage error due to a dead time and an ON-state voltage drop in power elements to energize an AC motor. A motor current Iq is measured and the voltage drop is estimated as a function of the motor current from a function table or an approximation equation. The voltage drop is taken as the mean value of a voltage drop over the transistor and the voltage drop over the corresponding anti-parallel diode. In this way, a voltage detector is not required.

Another control approach is based on the geometry of PWM waveforms and does not require conventional feedback. The PWM waveforms from a modern frequency inverter are almost perfect square-waves. The mean value of such waveforms is a function of the pulse widths and the amplitudes. Consequently, it is sufficient to create PWM waveforms with correct amplitudes and pulse widths, which can be calculated or estimated, in order to obtain a correct mean value, which means that feedback may no longer be required.

However, the amplitudes of the PWM waveforms are distorted by unavoidable voltage drops in the power circuit. Thus, a new control strategy is desired, which takes advantage of the above-mentioned observations in order to provide improved control accuracy without conventional feedback. The strategy may as well be combined with any type of feedback.

SUMMARY OF THE INVENTION

Accordingly, an object of the present invention is to mitigate, alleviate or eliminate at least one of the above-identified deficiency and disadvantage.

In an aspect, there is provide a method of operating a bridge power supply circuit comprising at least two switch members connected in series between two rails and operated alternatingly to provide a pulse width modulated output signal at a junction between the two transistors, the method comprising: providing a control signal ($U_{control}$) for the pulse width modulated output signal; calculating timing signals ($T_1$, $T_2$) for activation of the switch members for providing said pulse width modulated output signal at an output of the circuit; characterized by: measuring a voltage drop over at least one of the switch members in a time window when it is conducting; and compensating for the voltage drop over the switch members by influencing upon the calculated timing signals in dependence of said measured voltage drop in said time window.

In an embodiment, the compensation may be performed by adding said measured voltage drop to said control signal before calculating said timing signals. In another embodiment, the addition may be performed by adding to said control signal said voltage drop multiplied by a constant which may be between 0.6 and 1.4, for example between 0.7 and 1.2, such as between 0.7 and 0.9, for example 0.8.

In a further embodiment, the bridge power supply circuit may comprise at least two phases, such as three phases, each phase comprising two switch members connected in series, wherein all phases may be compensated by a measured voltage drop over a single switch member in said time window. Alternatively, the bridge power supply circuit may comprise at least two phases, such as three phases, each phase comprising two switch members connected in series, wherein each phase is compensated by a measured voltage drop over a single switch member in each phase. In a further alternative, the bridge power supply circuit may comprise at least one phases, such as three phases, each phase comprising two switch members connected in series, wherein each phase is compensated by measured voltage drops over both switch members in each phase.

In a still further embodiment, the measured voltage drop may influence upon the pulse width on the next PWM cycle after the actual measurement. The measured voltage may be measured adjacent a middle or an end of a PWM cycle when the switch member is conducting. The measured voltage may be measured continuously or sampled all the time, while only the measurement values inside said time window are used.

In another aspect, there is provided a device for operating a bridge power supply circuit comprising at least two switch members connected in series between two rails and operated alternatingly to provide a pulse width modulated output signal at a junction between the two transistors, the device comprising: an input for receiving a control signal ($U_{control}$) for the pulse width modulated output signal; a calculation device for calculating timing signals ($T_1$, $T_2$) for activation of the switch members for providing said pulse width modulated output signal at an output of the circuit; characterized by: a measuring device for measuring a voltage drop over at least one of the switch members in a time window when it is conducting; and a compensation device for compensating for the voltage drop over the switch members by influencing upon the calculated timing signals in dependence of said measured voltage drop.

In an embodiment, the device may comprise a multiplication device for multiplying said voltage drop by a constant, which may be between 0.6 and 1.4, for example between 0.7 and 1.2, such as between 0.7 and 0.9, for example 0.8.

In a further embodiment, the bridge power supply circuit may comprise at least two phases, such as three phases, each phase comprising two switch members connected in series, wherein all phases may be compensated by a measured voltage drop over a single switch member in said time window. Alternatively, the bridge power supply circuit may comprise at least two phases, such as three phases, each phase comprising two switch members connected in series, wherein each phase may be compensated by a measured voltage drop over a single switch member in each phase. In a further alternative, the bridge power supply circuit may comprise at least one phases, such as three phases, each phase comprising two switch members connected in series, wherein each phase may be compensated by measured voltage drops over both switch members in each phase.

In a still further embodiment, the measuring device may be adapted to measure said voltage continuously or sample said voltage all the time, while only the measurement values inside said time window may be used.

BRIEF DESCRIPTION OF THE DRAWINGS

Further objects, features and advantages of the invention will become apparent from the following detailed description of embodiments of the invention with reference to the drawings, in which.

DETAILED DESCRIPTION OF EMBODIMENTS

Below, several embodiments of the invention will be described with references to the drawings. These embodiments are described in illustrating purpose in order to enable a skilled person to carry out the invention and to disclose the best mode. However, such embodiments do not limit the invention. Moreover, other combinations of the different features are possible within the scope of the invention.

A definition may help to avoid confusion in the following description. There are two different signals in the system. The "control signal" is the original signal that is calculated by the motor control system in order to control the motor. It is normally sine-shaped during steady state conditions. The frequency of this signal is typically 50 Hz (or 60 Hz) when it is used to control a standard AC motor at nominal speed. The "PWM-signal" signal represents the same control signal, however in a different form after pulse width modulation. The pulse width modulation is made with a much higher frequency, typically in the range 2-20 kHz.

The present embodiments may be used for a frequency inverter for a three phase AC induction motor as will be described in details herein. However, the embodiments may be used for a motor having any number of phases, such as one phase or six phases. The embodiments may be used for any type of electric motor, which is driven by a PWM-modulated power module. The embodiments may be used for any type of electric load, which is driven by a PWM-module, such as a class D amplifier as mentioned above.

Figure 1:
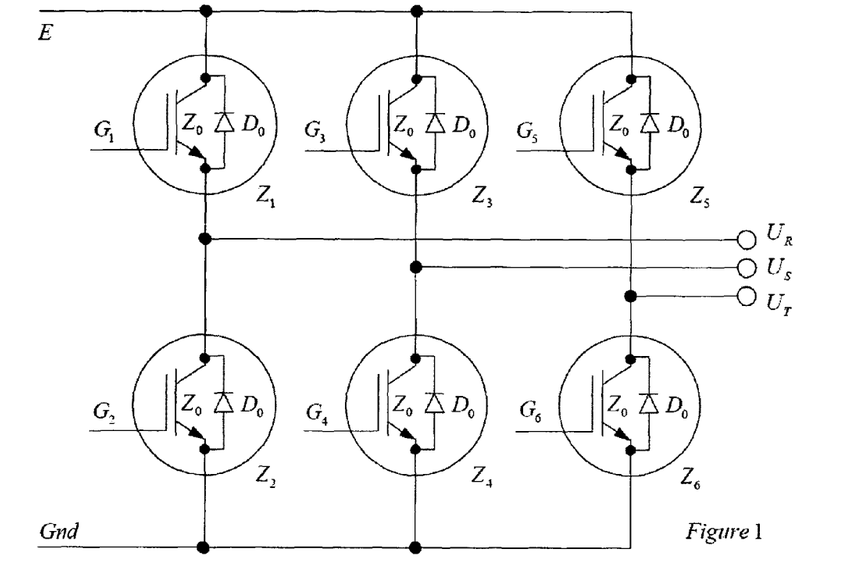
FIG. 1 is a schematic diagram of a conventional power circuit in a three-phase transistor bridge for control of electric motors or other objects.

FIG. 1 shows a typical three-phase bridge power supply circuit for driving electric motors or other types of electric loads. The number of phases may be any number, such as one, two or three phases. This is a general solution for control of three-phase AC motors. The bridge power supply circuit is supplied with DC power from a "DC-link" and delivers PWM output power to three motor phases. The DC-link normally comprises a large electrolytic capacitor connected to a rectifier, which rectifies an AC line voltage, which may be the ultimate power source. In other applications the power may come from a battery, a fuel cell or other power sources.

The DC-link has a minus bus and a plus bus. Here the minus bus is defined as a reference for the whole system and indicated by the symbol "Gnd" (Ground). The plus bus is indicated by the symbol "E" and consequently the bridge voltage is E. The minus bus may be defined as "signal ground". The voltage between the plus and minus bus is often referred to as $U_{DC-link}$. All control signals and measured signals are then referenced to the minus bus. The entire system may be controlled by a digital processor and this processor may also be referenced to the minus bus. This has practical advantages because the minus bus may serve as a stable reference for the whole system.

It should be mentioned that the signal ground may have a different electrical potential than a common ground that may be defined as "earth" or "protective ground". This has to do with the operation of the line rectifier. The potentials on the plus and minus bus depend on which one of several line rectifiers that are conducting. Consequently the potential level and the signal ground of the whole DC-link system move up and down in synchronism with the line voltage in relation to an earth potential. However, thanks to the definition of the minus bus as a "signal ground" this can be neglected in the present description.

The bridge power supply circuit of FIG. 1 comprises 6 identical power transistors $Z_1$-$Z_6$, connected in 3 groups each with 2 transistors in series between the plus E and minus Gnd bus. The output voltages to the motor are defined as $U_R$, $U_S$, $U_T$. The power transistors are controlled by individual gate signals $G_1$-$G_6$. The theory for motor control and the control circuits for the gates are not the subject matter of the present disclosure and are not further described here. Reference may be made to EP 0515469B1, which discloses a control method for AC induction motors. Reference may also be made to EP 0 334 886, which discloses a strategy for PWM control of a motor circuit.

A complete unit for motor control is called a "frequency inverter". A complete bridge circuit with all 6 power transistors may be built together in a complete "power module".

In FIG. 1, each of the power transistors $Z_1$-$Z_6$ is shown as an IGBT (Insulated Gate Bipolar Transistor) $Z_0$, which is connected in parallel with a separate "anti-parallel" diode $D_0$. The transistor forms the switching element and the diode serves as a so-called "free-wheeling" diode. The IGBT has become the dominating power transistor for certain types of applications, especially motor control. Other transistor types, such as bipolar transistors or MOSFET's may be used instead.

Especially when the 6 power transistors are arranged as a complete set inside a power supply module, it can be assumed that they are almost identical and have similar characteristics and are exposed to substantially similar environment (same temperature). However, also separate components of the same type can be assumed to have similar data. This is one of the assumptions for the present embodiments. However, if the components have different characteristics it will be possible to measure the voltage drops across all the components, according to another embodiment.

Figure 2:
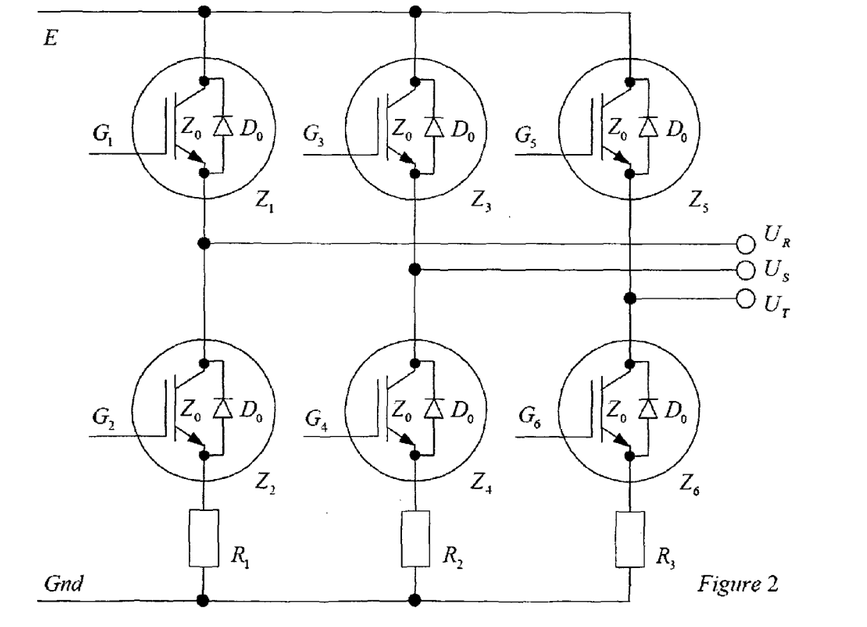
FIG. 2 is a similar diagram with measuring resistors for the output current.

FIG. 2 shows a variant of FIG. 1, popular for low cost, low power frequency inverters. The motor currents are measured indirectly over a resistor in each phase when the lower transistor is conducting. Then the motor currents give a voltage drop across the measuring resistors $R_1$-$R_3$.

However, some of the embodiments described below will consider the voltage drops across the lower transistors. The measuring equipment described in the following may be designed in such a way that it measures only the voltage drop across the transistor. Consequently, the present embodiment may be useful for systems both according to FIG. 1 and FIG. 2. Some alternative methods for measurement will be described in the following.

The output voltages from the transistor bridge are distorted by (small) voltage drops across internal diodes in the transistor bridge. The strategy according to an embodiment is to compensate for these voltage drops individually in each phase.

Figure 3:
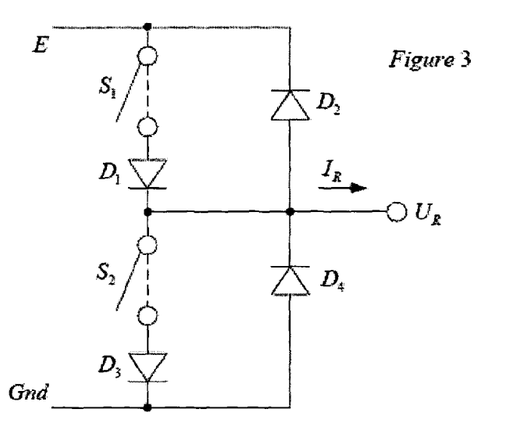
FIG. 3 is an equivalent model of the transistor bridge in one phase.

All three phases R,S,T in the motor control system are identical and consequently it is sufficient in the present description to study one phase. FIG. 3 shows a symbolic model of one phase, for example phase R with the power transistors $Z_1$ and $Z_2$. The IGBT inside power transistor $Z_1$ is now represented as a switch $S_1$ in series with a diode $D_1$. This structure is typical for an IGBT. There is always a diode inside the bipolar transistor structure. The separate anti-parallel diode $D_2$ is the same as the diode $D_0$ in FIG. 1. The diodes in FIG. 3 have got individual numbers in order to explain the embodiment. The lower power transistor $Z_2$ is represented in a similar way by the components $S_2$, $D_3$ and $D_4$. The voltage drops across the diodes $D_1$-$D_4$ will be indicated as $V_{D1}$-$V_{D4}$. The voltage drops are of interest only when the diodes are conducting and consequently they are always positive.

It is assumed in the following that the switches $S_1$ and $S_2$ are ideal and create the intended PWM waveforms exactly, i.e. with switching exactly in the right time instants. It is well known, however, that there are switching delays in all real circuits. It is also necessary to have a so called "dead time" or "blanking time" between turn-off and turn-on of the two transistors, in order to avoid short circuit between the plus and minus bus. Such problems can, however, be compensated for by the control system. Such solutions are not discussed or described in this description.

Figure 4:
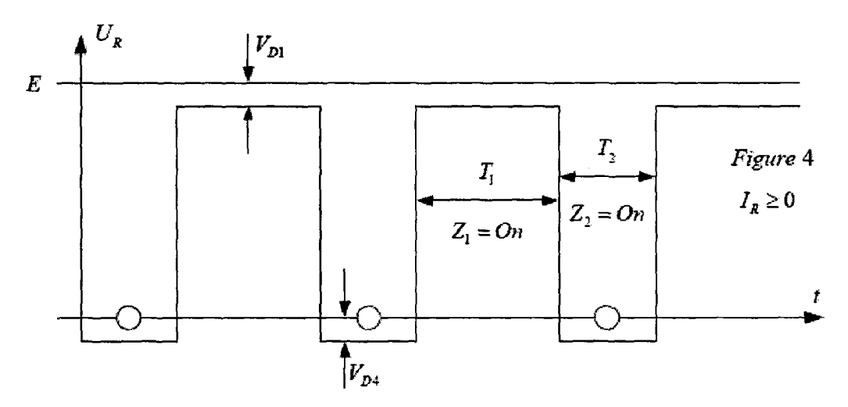
FIG. 4 is a time diagram of the output voltage from the transistor bridge when the output current is positive.

FIG. 4 shows the PWM switching waveforms for the output voltage $U_R$ in phase R when the current $I_R$ is flowing in positive direction from the bridge circuit to the motor. It is a typical property of motor drives that the load (the motor) is highly inductive in relation to the rest of the system. Because of this the motor current changes slowly and it can be considered to be approximately constant during one complete PWM cycle.

Switch $S_1$ (FIG. 3) is ON during the time $T_1$ and switch $S_2$ in ON during the time $T_2$. Although there is a "dead time" (not shown) when none of the transistors are allowed to conduct, the output current is continuous (because of the inductive character of the load). Consequently, there is always a current in plus or minus directions (except when the inductive output current is zero).

The total period time in the PWM cycle is $(T_1+T_2)$. The switches are considered to be almost ideal with no or small voltage drops.

The current $I_R$ flows through the switch $S_1$ and the diode $D_1$ during time $T_1$. Consequently, the output voltage $U_R$ is $(E-V_{D1})$.

The current $I_R$ flows through the anti-parallel diode $D_4$ during time $T_2$. Consequently, the output voltage $U_R$ is $(0-V_{D4})$.

Observe that the output voltage $U_R$ goes below the voltage on the minus bus. It is possible to calculate the mean output voltage $U_{R-mean}$ during one complete PWM cycle:

$$U_{R-mean} = (E - V_{D1})\frac{T_1}{T_1 + T_2} + (0 - V_{D4})\frac{T_2}{T_1 + T_2}$$

Assume that: $V_{D1} = V_{D4}$

Then: $U_{R-mean} = E\frac{T_1}{T_1 + T_2} - V_{D4}$

The assumption that $V_{D1}$ is equal to $V_{D4}$ means that the voltage drop over the "upper" IGBT during conduction is considered to be equal to the voltage drop over the "lower" anti-parallel diode during conduction.

Figure 5:
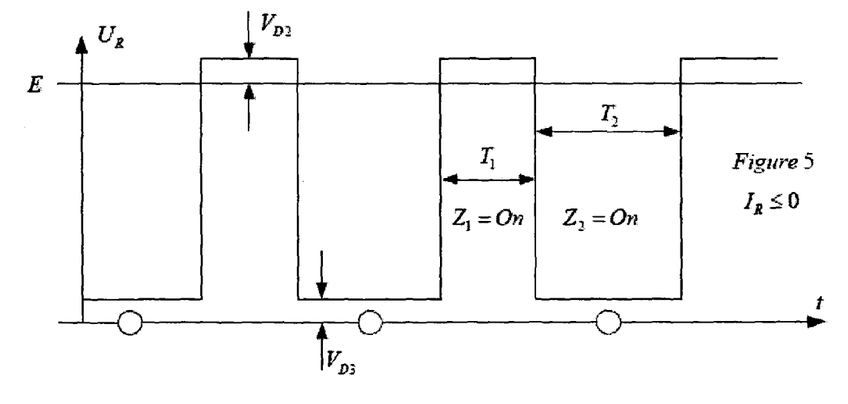
FIG. 5 is a time diagram of the output voltage from the transistor bridge when the output current is negative.

FIG. 5 shows the PWM switching waveforms for the output voltage $U_R$ in phase R when the current $I_R$ is flowing in negative direction from the motor into the bridge circuit. The current $I_R$ flows through the switch $S_2$ and diode $D_3$ during time $T_2$. Consequently, the output voltage $U_R$ is $(0+V_{D3})$.

The current $I_R$ flows through the anti-parallel diode a during time $T_1$. Consequently, the output voltage $U_R$ is $(E+V_{D2})$.

Observe that the output voltage $U_R$ goes above the voltage on the plus bus.

It is possible to calculate the mean output voltage $U_{R-mean}$ during one complete PWM cycle:

$$U_{R-mean} = (E + V_{D2})\frac{T_1}{T_1 + T_2} + (0 + V_{D3})\frac{T_2}{T_1 + T_2}$$

Assume that: $V_{D2} = V_{D3}$

Then: $U_{R-mean} = E\frac{T_1}{T_1 + T_2} + V_{D3}$

The assumption that $V_{D2}$ is equal to $V_{D3}$ means that the voltage drop over the "lower" IGBT during conduction is considered to be equal to the voltage drop over the "upper" anti-parallel diode during conduction.

The system gives a correct output voltage as calculated from the time periods $T_1$ and $T_2$ and from the rail voltage E, except for the errors caused by the diode voltage drops. The purpose of the embodiments is to compensate for these voltage drops.

The voltage across the lower transistor $Z_2$ may be measured in a time window when the lower transistor is conducting. The measured voltage may be added as compensation to the control voltage for the actual phase during the next PWM cycle.

The measurement time instants according to a first embodiment are indicated by small circles on the time line in FIG. 4 and FIG. 5. Measurement may be done in the center of the pulse time $T_2$ when the lower transistor is ON. The reason is that transients in the waveform (ringing) may occur in the beginning of the pulse. The transients should be given time to disappear before the measurement is performed. Thus, no measurement is performed during the pulse time $T_1$.

The measurement can alternatively be made at the end of pulse time $T_2$ or at any time after the transients have disappeared, however, still during the time window of the pulse time $T_2$.

It is possible, although not described here, to synchronize the measurement instants to the PWM frequency by help of available information from the PWM generator.

If the current is positive, the measured diode voltage will be $V_{D4}$ and if the current is negative the measured diode voltage will be $V_{D3}$. The sign of the compensation will be different in the two cases. The measurement may be done in the center of the time window when the lower transistor is ON, or at any time after the transients have disappeared, however still only during the time window when the transistor is ON.

Figure 6:
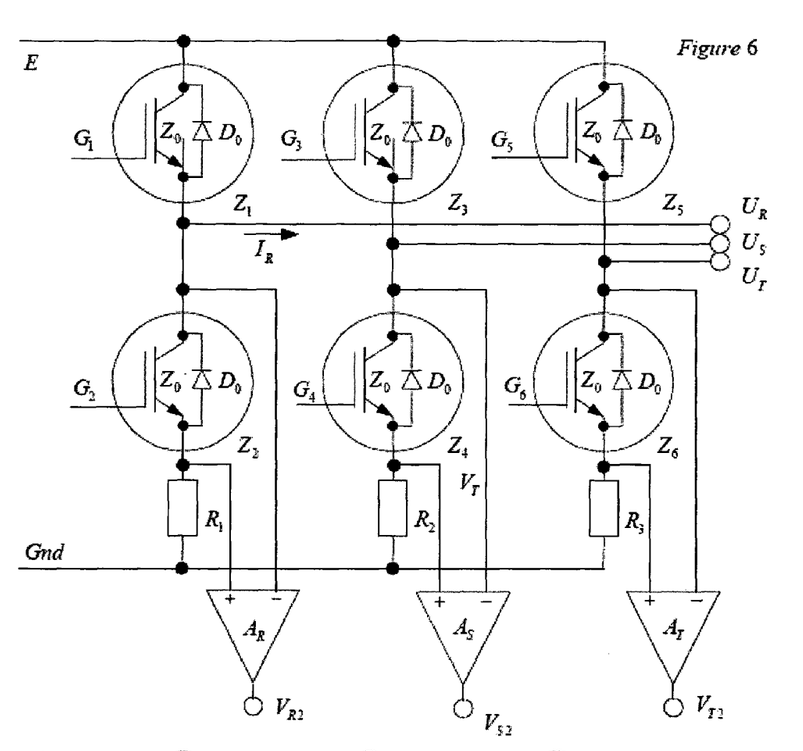
FIG. 6 is a circuit diagram showing the three-phase transistor bridge together with measuring amplifiers across the lower transistors.

FIG. 6 shows how the voltage across the lower transistors may be measured by measuring units $A_R$, $A_S$, $A_T$.

Figure 7:
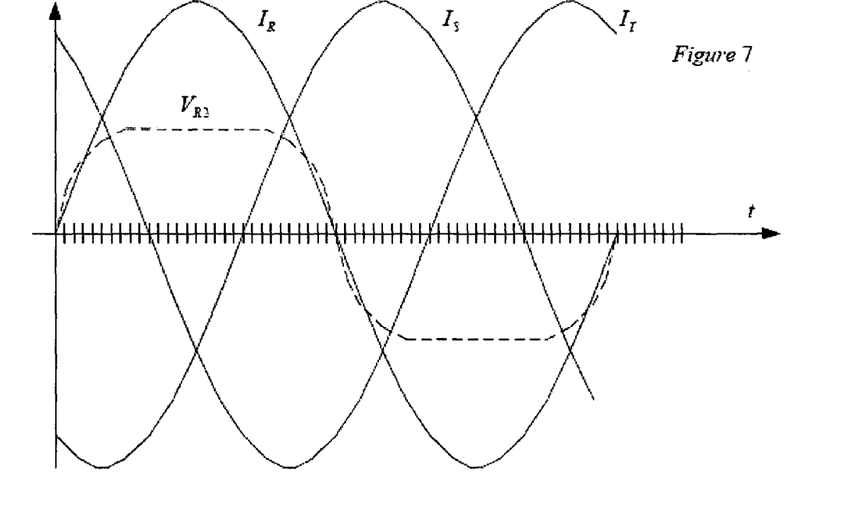
FIG. 7 is a time diagram of the measured waveform in one phase.

FIG. 7 is a time diagram showing the three phase currents $I_R$, $I_S$ and $I_T$. The currents are almost identical during steady state conditions, except for the phase shift. The measured voltage $V_{R2}$ in phase R is also shown by a broken line. It is a non-linear function of $I_R$ and represents the voltage drop across one of the diodes inside $Z_2$, either $D_3$ or $D_4$, depending on the sign of the current. Observe that the measuring amplifier inverts the signal. Similar wave shapes (although not shown) exist for phase S and phase T. It is important to understand that the curve $V_{R2}$ illustrates measured values of the voltage across transistor $Z_2$.

The signal is measured only in the time window when the transistor or the anti-parallel diode is conducting (ON) and consequently the voltage across the transistor is low, typically a few volts. This feature enables the use of cheap voltage measurement devices, for example an A/D-converter having ten bits resolution for accurate measurement of the voltage across the power transistor or the corresponding diodes. If the voltage should be measured outside said time window, when the voltage may be as high as 500 V, it may be necessary to use more expensive measurement devices in order to measure the forward voltage drop over the transistor with a sufficient accuracy.

For example EP 0588213A2, mentioned above, states that a voltage detector for detecting the output voltage is dispensed with. Instead, the currents through the power elements are measured and the voltage drops across the power transistors are estimated. However, the voltage drop is not linear, as shown in FIG. 7, and is dependent on the temperature of the transistor, which can vary from ambient temperature up to 150° C. Thus, by such estimation it may be difficult to achieve a sufficient accuracy.

The embodiments are based on the possibility to measure the voltages in exactly the right moment in order to extract the useful information, namely when the corresponding transistor is conducting and the voltage over the transistor is low. The voltage across transistor $Z_2$ is much higher when the transistor $Z_2$ is non-conduction and the other transistor $Z_1$ is conducting. See the time diagrams in FIG. 4 and FIG. 5 with the PWM voltage $U_R$. The measurement frequency (which is much higher than the signal frequency), is symbolically shown by short vertical lines on the time axis.

Figure 8:
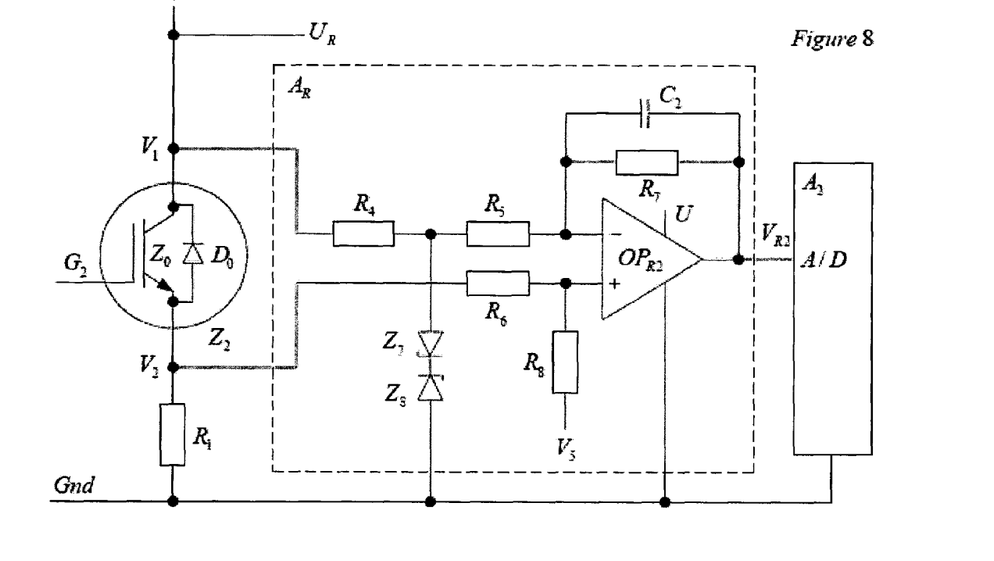
FIG. 8 is a circuit diagram of a measuring amplifier in one phase.

FIG. 8 gives an example of an embodiment of the measuring circuit. Only phase R is shown but all phases may have identical measuring circuits.

An operational amplifier $OP_{R2}$ serves as a measuring and level-shifting amplifier. It is supplied by a DC voltage U, typically 5 V or 3.3 V.

The measurements are made when the lower transistor is ON and then the diode voltages are relatively small (less than 5 V). However, the voltage across the lower transistor can be much higher (=E) when the upper transistor is ON and the lower transistor is OFF. The DC-link voltage E is typically 320 V in a normal European one-phase system or 560 V in a three-phase system. In order to protect the measuring circuit from the high voltage, there is a voltage limiter consisting of resistor $R_4$ and the Zener diodes $Z_7$ and $Z_8$. A suitable Zener voltage would be 5 V. The resistor $R_4$ must have such a high resistance that the Zener current is limited to safe values. A suitable value for $R_4$ in a 320 V systems would be 200 kohm. Then the Zener current would be 1.6 mA and the heat dissipation would be relatively small.

The Zener diodes will not be conducting when the lower transistor is ON, because the voltage across the transistor will be low. Consequently, then the operational amplifier $OP_{R2}$ works as a classical differential amplifier. It measures the differential voltage $(V_1-V_2)$ across the power transistor $Z_2$ and gives an output voltage $V_{R2}$.

The following is a design example according to conventional design rules for differential amplifiers:

$$R_4 + R_5 = R_6 = 210 \text{ kohm}$$

$$R_7 = R_8 = 70 \text{ kohm}$$

$$\text{Then: } V_{R2} = -(V_1 - V_2)\frac{R_8}{R_6} + V_5 = -\frac{V_1 - V_2}{3} + V_5$$

Observe that the measuring amplifier inverts the signal. However; in another embodiment, the amplifier does not invert the signal.

The output voltage $V_{R2}$ can be connected to an analog to digital converter $A_2$ as indicated in FIG. 8. The converter may be a separate component supplied by the same voltage U as the differential amplifier. In other cases it can be an integrated component in a special microprocessor or DSP (Digital Signal Processor) for motor control. The complete motor control system is typically a digital system and the complete software can be realized in such a processor.

The operating amplifier $OP_{R2}$ operates continuously while the analog to digital converter $A_2$ controls the timing of the measurement or sampling operations.

The capacitor $C_2$ in the feedback connection for the operational amplifier should have a small value. The purpose is to eliminate high frequency noise but not to distort the measurement signal.

The fixed offset voltage $V_5$ is intended to shift the output signal level to positive values for all input signals. Many microprocessors operate on 3.3 V and the analog to digital converter operates between 0 V and 3.3 V. Then 1.65 V input signal represents the digital value zero and the signal swing is +/−1.65 V relative to the midpoint. Consequently, a suitable value for $V_5$ is +1.65 V.

The differential amplifier in the above example attenuates the signal 3 times. This means that +/−1.65 V at the input to the analog to digital converter corresponds to a measuring range across the transistor of +/−4.95 V.

An advantage of this measuring circuit is that it can measure small voltages with high accuracy and resolution. 10 bit resolution in the analog to digital converter results in 1024 steps. One digital step will represent approximately 0.01 V if the system can measure +/−5 V. This is because the measurement is made only in said time window when the transistor or the anti-parallel diode is conducting. Outside said time window, the input of the measurement device is clamped by the Zener diodes.

If the system were designed for measuring the whole voltage across transistor $Z_2$ it would be difficult to obtain a reasonable accuracy and resolution. One digital step (10 bit resolution) in a 320 V system would represent 0.32 V. One digital step in a 560 V system would represent 0.56 V.

The offset voltage $V_5$ in FIG. 8 should be able to shift the signal level to exactly the correct value that represents zero volts in the digital system. It is, however, not harmful if the level is slightly wrong, as long as the same offset voltage is used in all three phases. A three-phase AC motor will not notice if all the three phase voltages are shifted up or down with the same value. The voltages between the phases will not change because of such a level shift.

Figure 9:
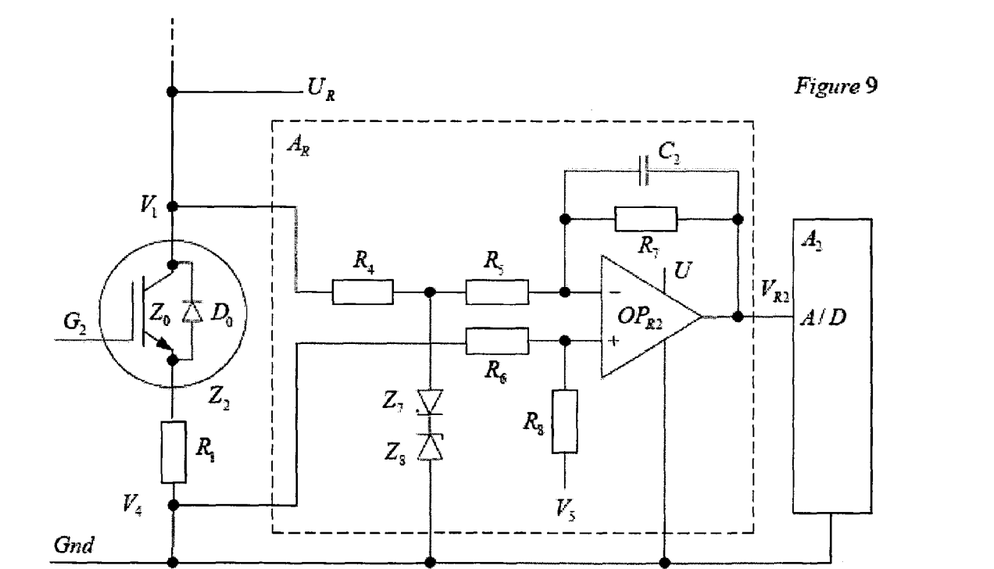
FIG. 9 is a circuit diagram of an alternative version of a measuring amplifier in one phase.

FIG. 9 shows an alternative version of FIG. 8, where the measuring system measures the differential voltage $(V_1-V_4)$ instead of the differential voltage $(V_1-V_2)$. This may be a simpler solution in some cases. The voltage drop across the current measuring resistor $R_1$ may be neglected or compensated for in software, based on the fact that the software has information about the current through the resistor and/or the voltage over the resistor.

Figure 10:
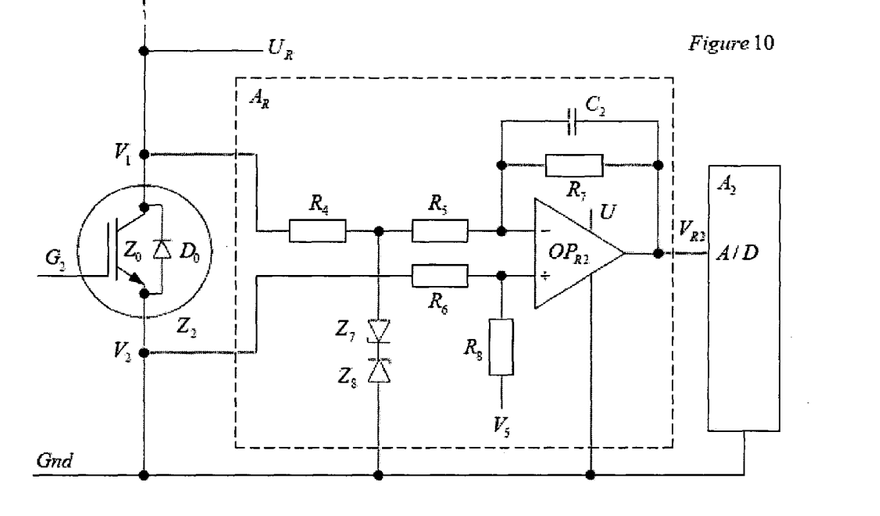
FIG. 10 is a circuit diagram of an alternative version of a measuring amplifier in one phase.

FIG. 10 shows the same system as in FIG. 8, however without the current measuring resistor $R_1$. Many motor control systems for high power have this configuration, because the motor currents are measured by separate equipment and not via resistors as in FIG. 8.

One assumption for the above embodiments is that all 4 diodes in FIG. 3 are substantially equal and that the voltage drops in the switches can be neglected. This is an approximation. It would be more accurate if also the voltage drop across the upper transistor $Z_1$ could be measured. For example, there may be differences in the temperature of the upper transistor compared to the temperature of the lower transistor.

Figure 11:
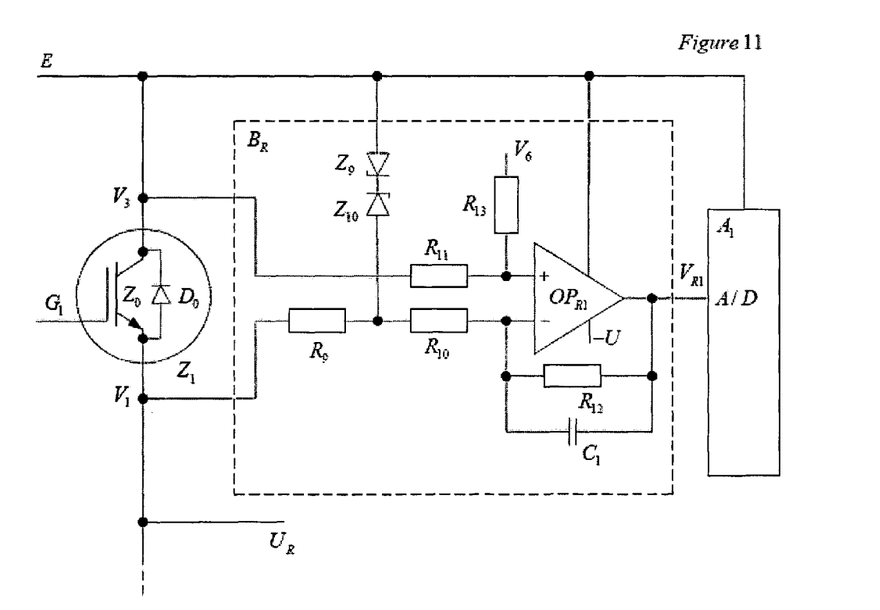
FIG. 11 is a circuit diagram of a measuring amplifier across the upper transistor.

FIG. 11 shows a similar measuring circuit as for the lower transistor $Z_2$. The system is based on the same type of operational amplifier $OP_{R1}$ as in FIG. 8 and corresponding passive components $R_9$-$R_{13}$, Zener diodes $Z_9$-$Z_{10}$ and capacitor $C_1$. The operational amplifier is supplied by a DC voltage U that should be negative relative to the plus bus E. The voltage $V_6$ should be chosen to give the required input signal to the A/D-converter $A_1$. Other configurations of the measuring components are possible.

The measuring system in FIG. 8 was activated when the lower transistor $Z_2$ was conducting. In an equivalent way, the measuring system in FIG. 11 is measured when the upper transistor $Z_1$ is conducting.

The same design rules have been followed in this example:

$$R_9 + R_{10} = R_{11} = 210 \text{ kohm}$$

$$R_{12} = R_{13} = 70 \text{ kohm}$$

$$\text{Then: } V_{R1} = -(V_1 - V_3)\frac{R_{12}}{R_{11}} + V_6 = -\frac{V_1 - V_3}{3} + V_6$$

It should be observed that all voltages in this equation are related to the plus bus E in FIG. 11. It will be shown later how the signal $V_{R1}$ can be level shifted and used in a real application.

Figure 12:
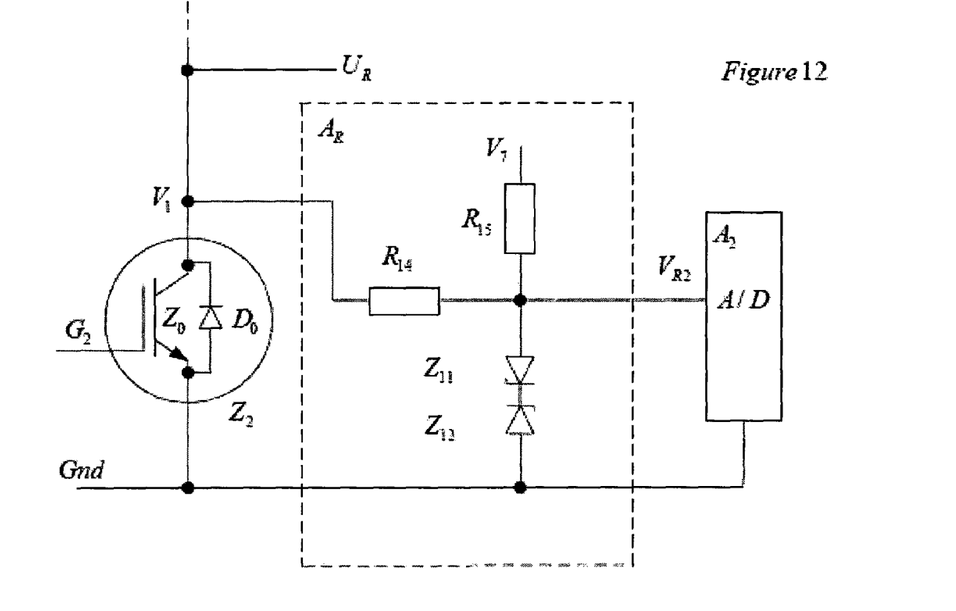
FIG. 12 is a circuit diagram for a simplified measuring system across the lower transistor.

FIGS. 9 and 10 show a measurement circuit that does not need a real differential amplifier because one of the input voltages was the same as signal ground Gnd. Consequently, a measuring circuit with only passive components can be used. FIG. 12 shows such a circuit, where:

$$V_{R2} = V_1 \frac{R_{15}}{R_{14} + R_5} + V_7 \frac{R_{14}}{R_{14} + R_{15}}$$

Observe that this system does not invert the signal.

The equation is valid when the lower transistor is conducting.

It is possible to choose resistance values and a value of the voltage $V_7$ to get the required input signal to the A/D-converter $A_2$.

Figure 13:
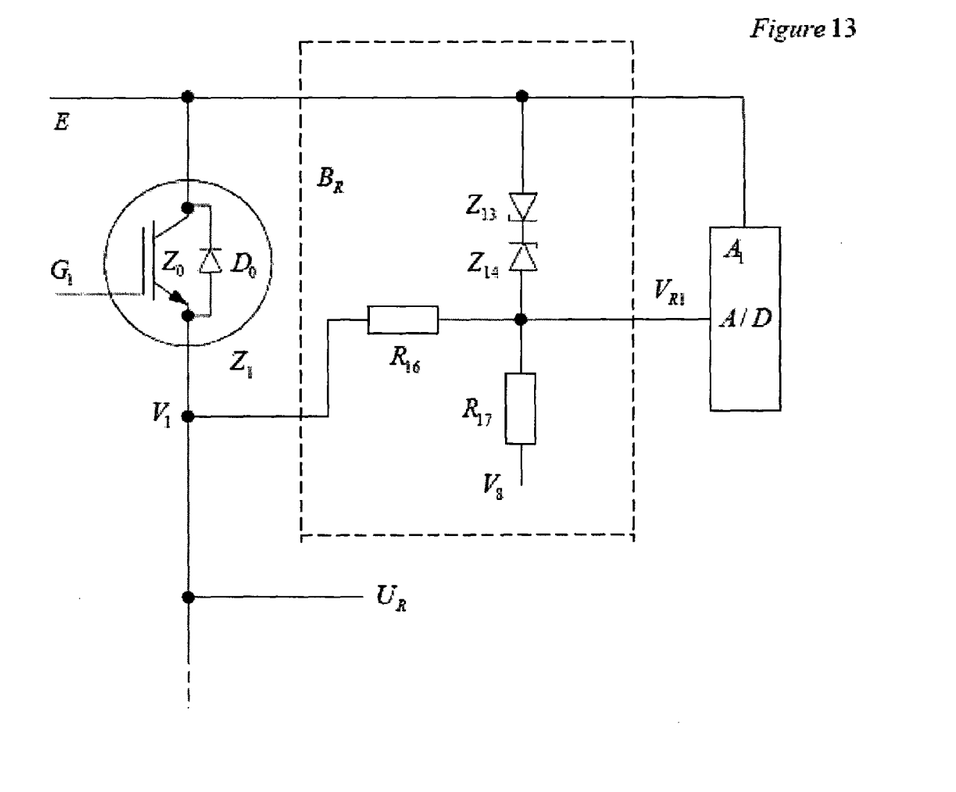
FIG. 13 is a circuit diagram for a simplified measuring system across the upper transistor.

FIG. 13 shows a similar circuit with passive components for measurement across the upper transistor $Z_1$, where:

$$V_{R1} = V_1 \frac{R_{17}}{R_{16} + R_{17}} + V_8 \frac{R_{16}}{R_{16} + R_{17}}$$

Observe that this system does not invert the signal.

This equation is valid when the upper transistor is conducting.

All voltages in this equation are related to the plus bus E.

FIG. 8 illustrates the measuring circuit $A_R$ where an A/D-converter $A_2$ measures or samples the voltage $V_{R2}$ in exactly the right moment, namely when the lower transistor $Z_2$ is conducting and after the transients have disappeared. The A/D-converter is connected to a microprocessor or DSP or can be an integral part of the microprocessor or DSP. The sampling process is a part of the embodiment, because it makes a measurement where the result can be used for compensation of the output PWM signal during the next PWM-period.

Figure 14:
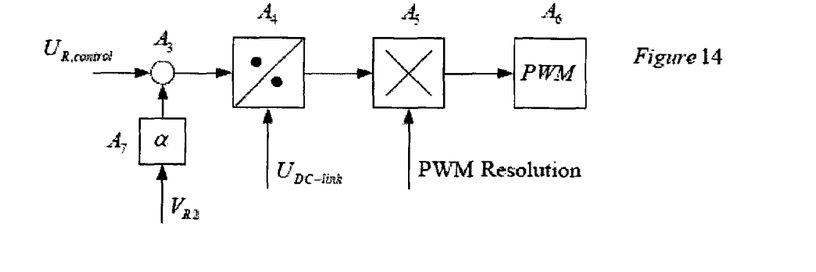
FIG. 14 is a schematic diagram illustrating the use of the measured signal in one phase.

FIG. 14 shows how the measured signal $V_{R2}$ can be used in order to compensate for the voltage drop. The voltage $V_{R2}$ is now represented by the digital value $V_{R2}$ inside a digital controller (a microprocessor, a DSP or some other digital device). The measured signal $V_{R1}$ (after level shifting) can alternatively be used instead of $V_{R2}$. Alternatively, a mean value of $V_{R1}$ and $V_{R2}$ can be used. For further alternatives, see below.

It would also be possible to use the original voltage $V_{R2}$ in an analog control system, although digital control systems are dominating today.

The motor control system (not described in this document) creates a control voltage $U_{R,control}$ for phase R. The compensating voltage $V_{R2}$ is added to the control signal in an adder circuit $A_3$. The signal $V_{R2}$ is before the addition multiplied with a scaling factor α that should be adjusted by the operator of the complete system until the output voltage is correct. The reason for this factor α is that the whole compensating system is based on simplifying assumptions, for example that the switches in FIG. 3 are ideal and that all four diodes are identical. Practical experience has shown that α=0.8 gives good results at least in one specific system. In other systems, the factor α may be between 0.6 and 1.4, for example between 0.7 and 1.2, such as between 0.7 and 0.9, for example 0.8.

The compensated signal $(U_{R,control}+\alpha V_{R2})$ at the output of the adder $A_3$ is divided by the voltage $U_{DC\ link}$ in a divider block $A_4$ in order to compensate for variations in the DC-link voltage. This is a well-known compensation in motor control systems. Then, the signal is multiplied in block $A_5$ with the signal PWM-Resolution before it enters the PWM-modulator $A_6$. The PWM-modulator is a standard component and may be an integral part of the digital controller and is not described here.

It would be possible to use the signal $V_{R2}$ in order to directly influence upon the pulse times $T_1$ and $T_2$ from the PWM-modulator. However, the solution according to FIG. 14 may be easier to implement in some systems.

FIG. 14 shows only phase R. Equivalent compensations should be made in the other phases.

Figure 15:
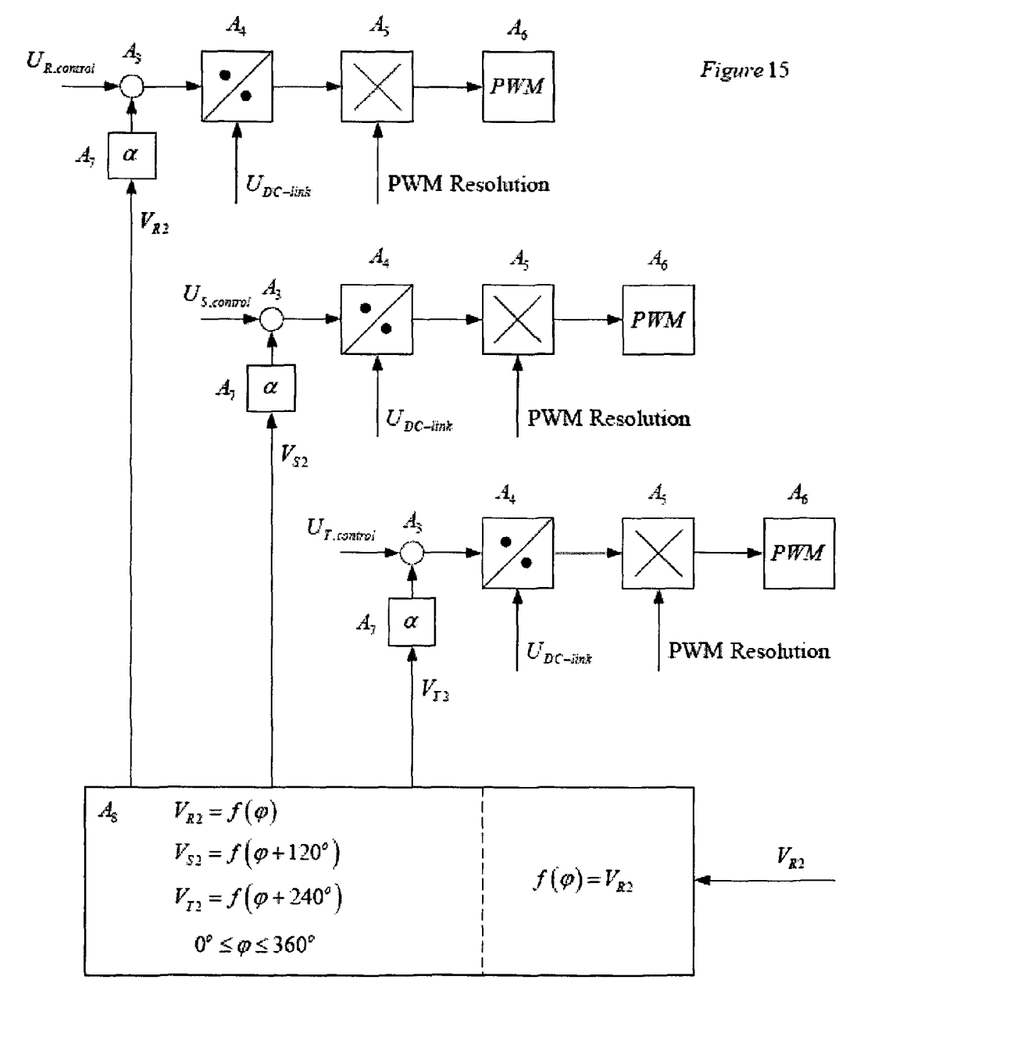
FIG. 15 is a schematic diagram similar to FIG. 14, illustrating how measurement in one phase can be used for control in three phases.

FIG. 15 shows a simplified solution where measurement of the diode voltage drop is made in one phase only, for example phase R. The assumption that the three phases are almost identical and have the same diode voltages makes it unnecessary to make measurements in all three phases.

The digital value of the measured signal $V_{R2}$ goes to a digital look-up table $A_8$. The look-up table operates as a shift register, array or indexed variable that is continuously updated with fresh data. The length of the shift register is 360 "electrical" degrees. The electrical degrees are defined in relation to the fundamental frequency in the motor control signal. The frequency range may be between 0 Hz and 50 Hz in a typical control system. The resolution in the shift register can be relatively low, for example 1 degree and then the shift register has 360 steps. It should be observed that the measurement frequency in the control system is much higher than the fundamental frequency. Often the measurement frequency is the same as the PWM frequency. Consequently there may be many measurements for every step in the shift register and only one value needs to be stored. Several solutions are possible, for example to store the mean value of some measurements or to store only the first or the latest measured value.

Phase S and phase T should be controlled by digital values $V_{S2}$ and $V_{T2}$ that are taken from the look up table with a phase shift 120 degrees and 240 degrees, respectively. Compare with FIG. 7.

For example, if the fundamental frequency is 2.8 Hz, each degree in the shift register corresponds to about 1 ms. If the PWM frequency is 10 kHz, there are 10 PWM cycles per degree in the shift register. In this case, for example the first measurement value in the first PWM cycle can be introduced in the shift register position for 0 degrees and used for the following nine cycles of the PWM signal for compensating $U_R$. Then, the measurement value stays in the shift register until shift period 120 degrees and is used for compensating $U_S$ (during 10 PWM cycles) and then stays in the shift register until shift period 240 degrees and is used for compensating $U_T$ (during 10 PWM cycles). This process is repeated for all degrees and then a new cycle starts.

Phase R may be controlled directly by the measured signal $V_{R2}$ as shown in FIG. 14, or the compensation value can be taken from the look-up table as shown in FIG. 15.

A consequence of this solution is that phase S and phase T are compensated by "old" values from earlier measurements in phase R. However, the whole compensation system is intended to make relatively small compensations of the total motor control voltages and this delay can be accepted. Also the differences between the three phases can be neglected if the power components in the three phases have similar characteristics.

Figure 16:
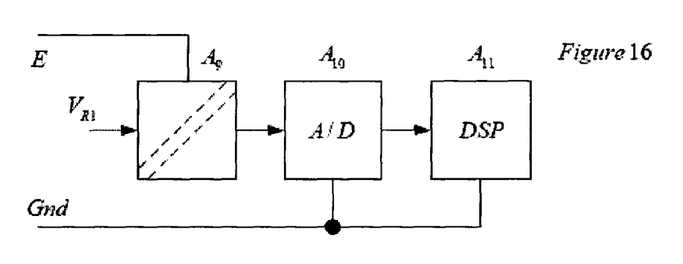
FIG. 16 is a schematic diagram similar to FIG. 14, illustrating how the measurement signal across the upper transistor can be level shifted to the same voltage level as the signal across the lower transistor.

FIG. 16 shows how the measured signal $V_{R1}$ from the upper transistor $Z_1$ goes to an isolation amplifier $A_9$ that makes a level shift of the signal down to the normal signal ground Gnd. An example of such an amplifier is ISO 122 or ISO 124 manufactured by Burr-Brown. Then the signal goes to a D/A-converter $A_{10}$ and a digital processor $A_{11}$ in the same way as the measured signal from the lower transistor.

Figure 17:
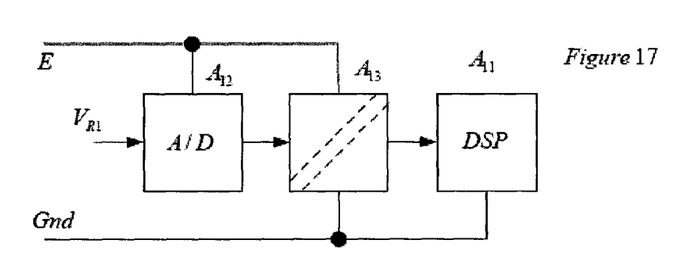
FIG. 17 is a schematic diagram similar to FIG. 16, illustrating an alternative method for level shifting.

FIG. 17 shows another example of the level shifting process. The signal $V_{R1}$ from the upper transistor $Z_1$ goes to a D/A-converter $A_{12}$ that is connected to the plus bus E. The digital value of $V_{R1}$ goes from $A_{12}$ to an optical link $A_{13}$ that transmits the signal down to the normal signal ground Gnd. The digital signal from $A_{13}$ can go directly to the digital processor $A_{11}$. The optical link $A_{13}$ may use serial or parallel transmission.

Figure 18:
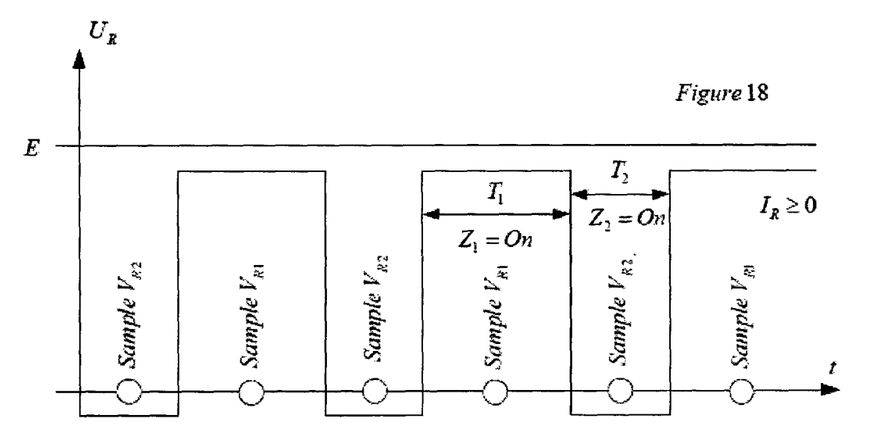
FIG. 18 is a time diagram of the output voltage from the transistor bridge with indication of measurement instants for the lower and upper transistors.

FIG. 18 shows a modified sampling scheme for a system that measures the voltage drop across both the lower and the upper transistor. The sampling is done when the actual transistor is conducting. The samplings of $V_{R2}$ and $V_{R1}$ are made at different time instants as indicated by small circles on the time line.

Figure 19:
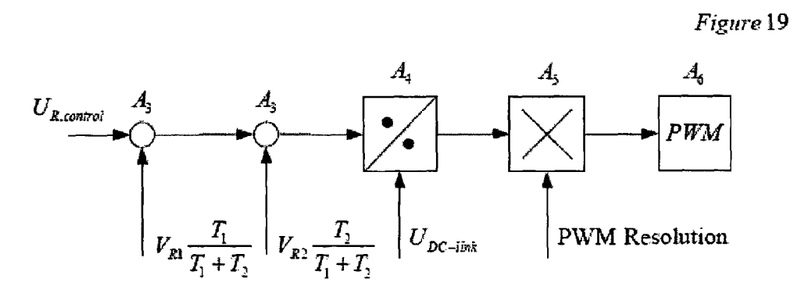
FIG. 19 is a schematic diagram similar to FIG. 14, illustrating the use of measured signals from the lower and the upper transistors.

FIG. 19 shows how the measured voltage drops from the two transistors should be scaled in dependence of the actual PWM times $T_1$ and $T_2$ and added to the control signal $U_{R,control}$.

The signal $V_{R1}$ is multiplied by the factor $T_1/(T_1+T_2)$.

The signal $V_{R2}$ is multiplied by the factor $T_2/(T_1+T_2)$.

Also in this case, the scaling factor α may be used on both signals in order to adjust for remaining errors in the compensation.

The measurement procedures, the sampling and the level shifting should be made according to the earlier descriptions. The same measurement should be repeated in phase S and phase T, or be replaced by values from a look-up table according to FIG. 15.

The diode voltage can be measured for one PWM period and used for a number of consecutive following cycles, for example for the next 10 cycles. Sometimes, it may happen that the next PWM cycle is already calculated when the diode voltage is measured and in this case, the diode voltage may influence upon the next following cycle, i.e. the second cycle after the measurement time. It is also possible to average several measurement values, for example average the three last measurements from three PWM periods.

The computer may have information about the time periods $T_1$ and $T_2$ mentioned above. In this case, the computer can initiate the diode measuring circuit in the right time instant, for example in the middle of the low period.

Figure 20:
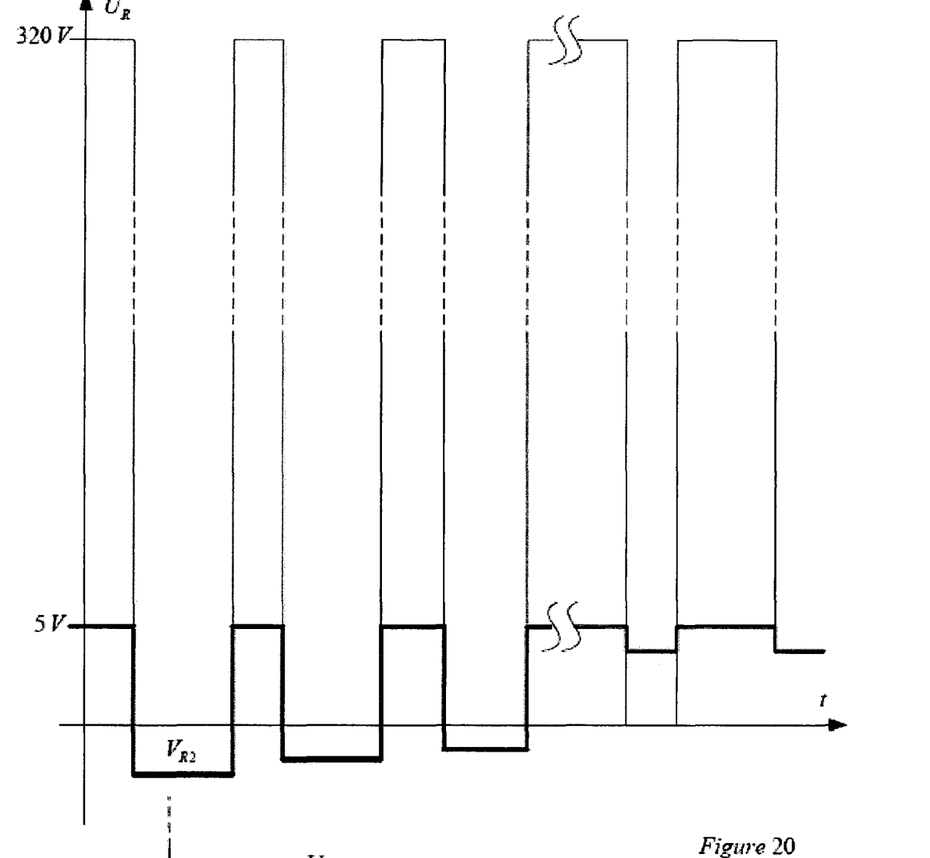
FIG. 20 is a time diagram of the measured signal similar to FIG. 7 but in an enlarged scale.

In other cases, there is no computer, but the control is analog. In this case, the measurement may take place in dependence of the PWM signal. FIG. 20 shows the PWM voltage in phase R. The time scale has been expanded in order to show the individual PWM cycles. The output voltage $U_R$ from the transistor bridge has a large swing, approximately the same as the DC-link voltage $U_{DC-link}$, for example 320 V. The output voltage $V_{R2}$ from the measuring circuit in FIG. 8 is indicated by bold lines. The voltage is clamped to a fixed value (5 V in this example) when the voltage $U_R$ goes high. Observe that the measuring amplifier in FIG. 8 for $V_{R2}$ inverts the signal.

Figure 21:
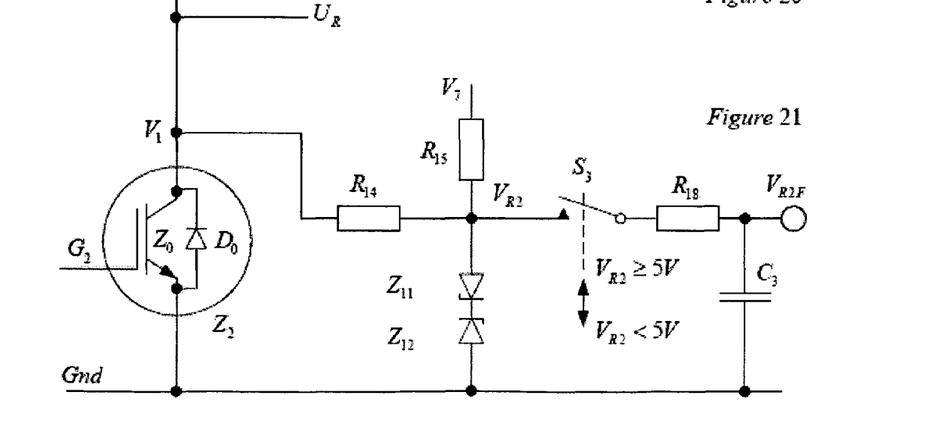
FIG. 21 is a circuit diagram of an alternative version of a measuring amplifier.

FIG. 21 shows a measuring circuit for the voltage $V_{R2}$ that is the same as in FIG. 12. A switch $S_3$ (preferably electronic) operates in dependence on the voltage $V_{R2}$. It is open when the voltage is 5 V or higher and closed when the voltage is below 5 V in said time window. The output signal from the switch is connected to an RC network $R_{18}$ and $C_3$. The resistor $R_{18}$ is intended to protect the system from too large charging currents to the capacitor. The capacitor serves as a memory element and "remembers" the voltage between the PWM cycles, also when the switch $S_3$ is open. Consequently, the capacitor voltage $V_{R2F}$ is a continuous representation of the voltage across the lower transistor during conduction. It has the same shape as the voltage $V_{R2}$ in FIG. 7. The signal $V_{R2F}$ from the capacitor can be measured or sampled by the analog motor control system with the same sample rate as the PWM frequency or with a different sampling rate.

Another strategy for measuring the diode voltage, would be to sample the output from the measuring circuit all the time with a predetermined sampling frequency, which for example is 10 times the PWM frequency. The sampled values are analyzed and those that are 5 V are discarded because these values represent the situation when the Zener diodes are conducting and clamping the measurement voltage. The sampled values that are lower than 5 V represent true measurement values when the transistor is conducting (ON) and may be used in any manner, for example averaged. Another manner would be to remove the highest and lowest value and average the remaining values.

A further strategy for measuring the diode voltage drop would be to integrate the output voltage from the measuring circuit during the entire ON-cycle of the lower transistor and divide the integrated voltage by the ON-time.

In one embodiment, measurement is made only across the lower transistor. If the ON-time of this transistor is very short or zero it will be difficult or impossible to make a good measurement. In such cases the strategy may be to remember the last good measurement and use it until it is possible to make new measurements.

The diode compensation circuit according to the present embodiments is especially important for control at low motor speeds, where the control voltages are low. A typical diode voltage is between 1 V and 2 V and this can be very harmful if the control voltage to the motor is in the same range.

Some AC motor drives operate from battery voltages as low as 12 V or 24 V, for example in fork lift trucks. Unfortunately, the diode voltages still have the same range as in high voltage systems. In such cases the diode voltages are much more harmful than in drive systems for high voltage, and consequently the importance of the embodiments is greater.

A modern "field oriented" control system controls the motor by two voltages named "$u_d$" and "$u_q$". The voltage $u_d$ controls the magnetizing current and the voltage $u_q$ controls the rotor current and mainly the torque and speed. The voltage $u_d$ dominates at low speed.

Motors for high power (hundreds of kilowatt) have a very low stator resistance and consequently the voltage $u_d$ can be as low as a few volts. In such cases the influence of the embodiments is very important. The compensation for diode voltage drops is necessary in order to create a correct magnetization at low motor speeds.

Some motor drive systems have a measuring system for the motor parameters that is activated before the normal drive operation. Such measuring systems operate with low voltages and need accurate control voltages. The present embodiments help to improve the accuracy of such systems.

There is an important difference between drive systems that have a sensor for measurement of the motor speed and such systems without a sensor (sensorless drives). Most systems with a sensor have current control loops for the motor currents. This means that the system measures the motor currents and compares them with the commanded currents. The difference between the currents is used as an error signal that goes to a control amplifier that calculates the voltage signal for the motor. This means that the voltage is automatically adjusted until the current is correct. There is no need for the control system to know the actual voltages as long as the currents are correct. The system already has enough information thanks to the sensor for rotor speed. In such a case there is no need for a measuring system according to the present embodiments.

There may, however, be a reason to increase the voltage control accuracy also in such systems, for example if the system is used to measure the motor parameters.

The situation is different in sensorless drives. Here the only available information is the motor voltages and currents. All other control signals must be calculated by help of these data and consequently they should be as accurate as possible. The interest for sensorless drives is steadily increasing, because such drives are cheaper and more robust than drives with a sensor.

The present embodiments have been possible thanks to modern digital control systems; where signals can be measured in exactly the right time instants. The diode voltage is measured when the lower transistor is conducting, but nevertheless the measured value is used for compensation during the following complete PWM cycle where both transistors are in operation.

Modern power electronics can operate with large temperature variations, and the power transistors may operate up to high temperatures, typically 150 degrees Celsius. The diode voltages change significantly because of these temperature variations and this increases the importance of the embodiments.

The embodiments have been described with reference to an inductive load. However, a capacitive or resistive load or a combination may also be used.

Although the present invention has been described above with reference to specific embodiment, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method of operating a bridge power supply circuit comprising at least two switch members connected in series between two rails and operated alternatingly to provide a pulse width modulated output signal at a junction between the two transistors for providing an alternating output voltage to a load, the method comprising:
   providing a control signal ($U_{control}$) for the alternating output voltage, whereby the control signal is an alternating signal;
   calculating timing signals ($T_1$, $T_2$) based on said control signal for activation of the switch members for providing said alternating output voltage at an output of the circuit;
   measuring a voltage drop over at least one of the switch members in a time window when it is conducting; and
   adding said measured voltage drop to said control signal before calculating said timing signals in said calculation step for calculating said timing signals,
   whereby the sum of said voltage drop and said control signal is used for compensating for the voltage drop over the switch members by influencing upon the calculated timing signals in dependence of the sum of said control signal and said measured voltage drop.

2. The method according to claim 1, wherein said addition is performed by adding to said control signal said voltage drop multiplied by a constant which is between 0.7 and 0.9.

3. The method according to claim 1, wherein said bridge power supply circuit comprises at least two phases, each phase comprising two switch members connected in series, wherein all phases are compensated by a measured voltage drop over a single switch member.

4. The method according to claim 1, wherein said bridge power supply circuit comprises at least two phases, each phase comprising two switch members connected in series, wherein each phase is compensated by a measured voltage drop over a single switch member in each phase.

5. The method according to claim 1, wherein said bridge power supply circuit comprises at least one phases, each phase comprising two switch members connected in series, wherein each phase is compensated by measured voltage drops over both switch members in each phase.

6. The method according to claim 1, wherein said measured voltage drop influences upon the pulse width on a next PWM cycle after the actual measurement.

7. The method according to claim 6, wherein said measured voltage is measured adjacent a middle or an end of a PWM cycle when the switch member is conducting.

8. The method according to claim 1, wherein said measured voltage is measured continuously or sampled all the time, while only the measurement voltages inside said time window are used.

9. The method according to claim 1, wherein said addition is performed by adding to said control signal said voltage drop multiplied by a constant which is 0.8.

10. The method according to claim 1, wherein said load is an induction motor.

11. A device for operating a bridge power supply circuit comprising at least two switch members connected in series between two rails and operated alternatingly to provide a pulse width modulated output signal at a junction between the two switch members for providing an alternating output voltage to a load, the device comprising:
   an input for receiving a control signal ($U_{control}$) for the alternating output, voltage, whereby the control signal is an alternating signal;
   a calculation device for calculating timing signals ($T_1$, $T_2$) based on said control signal for activation of the switch members for providing said alternating output voltage at an output of the circuit;
   a measuring device for measuring a voltage drop over at least one of the switch members in a time window when it is conducting; and
   an addition device for adding said measured voltage drop to said control signal before calculating said timing signals in said calculation device,
   whereby the sum of said voltage drop and said control signal is used for compensating for the voltage drop over the switch members by influencing upon the calculated timing signals in dependence of the sum of said control signal and said measured voltage drop.

12. The device according to claim 11, further comprising a multiplication device for multiplying said voltage drop by a constant, which is between 0.7 and 0.9.

13. The device according to claim 11, wherein said bridge power supply circuit comprises at least two phases, each phase comprising two switch members connected in series, wherein all phases are compensated by a measured voltage drop over a single switch member in said time window.

14. The device according to claim 11, wherein said bridge power supply circuit comprises at least two phases, each phase comprising two switch members connected in series, wherein each phase is compensated by a measured voltage drop over a single switch member in each phase.

15. The device according to claim 11, wherein said bridge power supply circuit comprises at least one phases, each phase comprising two switch members connected in series, wherein each phase is compensated by measured voltage drops over both switch members in each phase.

16. The device according to claim 11, wherein said measuring device is adapted to measure said voltage continuously or sample said voltage all the time, while only the measurement values inside said time window are used.

17. The device according to claim 11, wherein said load is an induction motor.

* * * * *